(12) United States Patent
Price et al.

(10) Patent No.: US 8,077,256 B1
(45) Date of Patent: Dec. 13, 2011

(54) SCENE-AWARE AUTOMATIC-EXPOSURE CONTROL

(75) Inventors: Douglas Price, San Jose, CA (US);
Xiaosong Zhou, Campbell, CA (US);
Hsi-Jung Wu, San Jose, CA (US);
James Oliver Normile, Los Altos, CA (US)

(73) Assignee: Apple, Inc., Cupertino, CA (US)

( * ) Notice: Subject to any disclaimer, the term of this patent is extended or adjusted under 35 U.S.C. 154(b) by 68 days.

(21) Appl. No.: 12/793,848

(22) Filed: Jun. 4, 2010

(51) Int. Cl.
*H04N 5/238* (2006.01)
(52) U.S. Cl. ........................................ 348/364
(58) Field of Classification Search .................. 348/296, 348/362–366
See application file for complete search history.

(56) References Cited

U.S. PATENT DOCUMENTS

| 5,793,422 A | * | 8/1998 | Mochizuki et al. | ........... 348/296 |
| 7,075,577 B2 | * | 7/2006 | Tang | .............................. 348/362 |

* cited by examiner

*Primary Examiner* — Timothy J Henn
(74) *Attorney, Agent, or Firm* — Wong, Cabello, Lutsch, Rutherford & Brucculeri, L.L.P.

(57) ABSTRACT

A scene-aware auto-exposure control process stabilizes changes in a camera's auto-exposure settings so as to reduce lighting and color flicker during image capture operations. A metric, referred to as the Modified Adjusted Luminance (MAL) metric, is defined to remain relatively constant as long as the lighting of the scene being captured remains relatively constant. Thus, scene changes such as an object moving into, out of, or around in a scene do not significantly affect the MAL metric's value and do not, therefore, trigger an exposure adjustment. Once the MAL metric indicates a scene's lighting is stable, the camera's auto-exposure operation may be suppressed. As long as incoming frames indicate a stable lighting condition (based on the MAL metric), auto-exposure operation may remain suppressed. When incoming frames result in a substantially different MAL over a specified number of frames, auto-exposure operation may be restored.

22 Claims, 8 Drawing Sheets

FIG. 1A
(UNSTABLE)

FIG. 1B
(STABLE)

**FIG. 1C
(METASTABLE)**

FIG. 3
(Block Selection)

FIG. 4
(Block Weighting)

SCENE-AWARE AUTOMATIC-EXPOSURE CONTROL

BACKGROUND

This disclosure relates generally to the field of digital processing. More particularly, but not by way of limitation, it relates to a technique for stabilizing auto-exposure operations in a digital image capture device.

Modern digital video cameras use techniques to estimate how much light a scene has and adjusts the camera's exposure time to maintain the level of light collected by the camera's sensors; this is generally referred to as auto-exposure adjustment or auto-exposure control. Scenes estimated to have to little light are brightened by increasing the exposure time (allowing more light to strike the camera's sensors). Scenes estimated to have to much light are darkened by decreasing the exposure time (allowing less light to strike the camera's sensors). Changes to the exposure often trigger changes in the white balance. Even sophisticated high-end digital cameras have difficulty determining the amount of actual light that exists in a scene due to differences in the luminance of features within a scene. A scene with many low luminance objects will often be falsely identified by a digital camera as a scene with low-light even when the scene's lighting is sufficient.

Current auto-exposure algorithms also face a difficult trade-off between adjusting the light too frequently or not frequently enough. Adjusting exposure too quickly can often result in the appearance of lighting flicker. Adjusting exposure too slowly can result in poor illumination. The problem is compounded by the difficultly of distinguishing between true lighting changes and changes in a scene's composition. The lighting flicker problem can be especially troublesome when combined with a video-encoder, as encoding efficiency can be greatly impacted by quick changes in the scene's lighting (due to exposure changes).

SUMMARY

A scene-aware auto-exposure control process is described that stabilizes changes in a camera's auto-exposure settings so as to reduce lighting and color flicker during image capture operations. Initially, while auto-exposure is on and functioning in a normal manner, successive frames may be compared until a frame metric becomes relatively constant over a specified number of frames. The metric, referred to as the Modified Adjusted Luminance (MAL) metric, is defined to remain relatively constant as long as the lighting of the scene being captured remains relatively constant. Thus, unlike prior art auto-exposure control techniques scene changes, such as an object moving into or out of the scene, do not significantly affect the MAL metric's value and do not, therefore, trigger an exposure adjustment. Once the MAL metric indicates the scene's lighting is stable, auto-exposure operation may be suppressed (e.g., turned off). Newly captured frames may thereafter be compared with the frame associated with the stabilized MAL value. As long as incoming frames indicate a stable lighting condition, auto-exposure operation may remain suppressed. When, however, incoming frames result in a substantially different MAL over a specified number of frames, auto-exposure operation may be restored.

An exposure control method in accordance with one embodiment includes: obtaining a first image having a plurality of blocks; obtaining a second image having a plurality of blocks; comparing a first plurality of blocks in the first image with co-located blocks in the second image; selecting a second plurality of blocks, from the first plurality of blocks, in the first image based the act of comparing; calculating a first value of a first metric based on the selected second plurality of blocks; and suppressing an image capture device's automatic exposure control operation if the calculated first value is stable with respect to a specified number of prior calculated values of the first metric. After the act of suppressing, the embodiment further includes obtaining a third image having a plurality of blocks, comparing a third plurality of blocks in the third image with co-located blocks in the first image, selecting a fourth plurality of blocks, from the third plurality of blocks, in the third image based the act of comparing, calculating a second value of the first metric based on the selected fourth plurality of blocks, and restoring the image capture device's automatic exposure control operation if the calculated second value is significantly different from a specified number of prior calculated values for the first metric, each of the specified number of prior calculated values for the first metric having been calculated after the act of suppressing the image capture device's exposure control operation.

In another embodiment an exposure control method includes: acquiring a first image frame from an image capture sensor in an image capture device; acquiring a second image frame from the image capture sensor in the image capture device; comparing blocks in the second image frame with corresponding blocks in the first image frame; selecting at least a minimum set of blocks in the second image frame based on the act of comparing, the selected blocks being a first plurality of blocks; calculating a luminance metric value based on the first plurality of blocks; suppressing the image capture device's automatic exposure-control if the calculated luminance metric value is stable; and restoring the image capture device's automatic exposure-control if a specified number of luminance metric values determined following the act of suppressing are at least a specified amount different from the calculated luminance metric value based on the first plurality of blocks.

DETAILED DESCRIPTION

A scene-aware auto-exposure control process is described that stabilizes changes in a camera's auto-exposure settings so as to reduce lighting and color flicker during image capture operations. Initially, while auto-exposure is on and functioning in a normal manner, successive frames may be compared until a frame metric becomes relatively constant over a specified number of frames. The metric, referred to as the Modified Adjusted Luminance (MAL) metric, is defined to remain relatively constant as long as the lighting of the scene being captured remains relatively constant. Thus, unlike prior art auto-exposure control techniques scene changes, such as an object moving into or out of the scene, do not significantly affect the MAL metric's value and do not, therefore, trigger an exposure adjustment. Once the MAL metric indicates the scene's lighting is stable, auto-exposure operation may be suppressed (e.g., turned off). Newly captured frames may thereafter be compared with the frame associated with the stabilized MAL value. As long as incoming frames indicate a stable lighting condition, auto-exposure operation may remain suppressed. When, however, incoming frames result in a substantially different MAL over a specified number of frames, auto-exposure operation may be restored.

In the following description, for purposes of explanation, numerous specific details are set forth in order to provide a thorough understanding of the inventive concept. It will be apparent to one skilled in the art, however, that the invention may be practiced without these specific details. In other instances, structure and devices are shown in block diagram form in order to avoid obscuring the invention. It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the image processing field having the benefit of this disclosure.

Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Figure 1A:
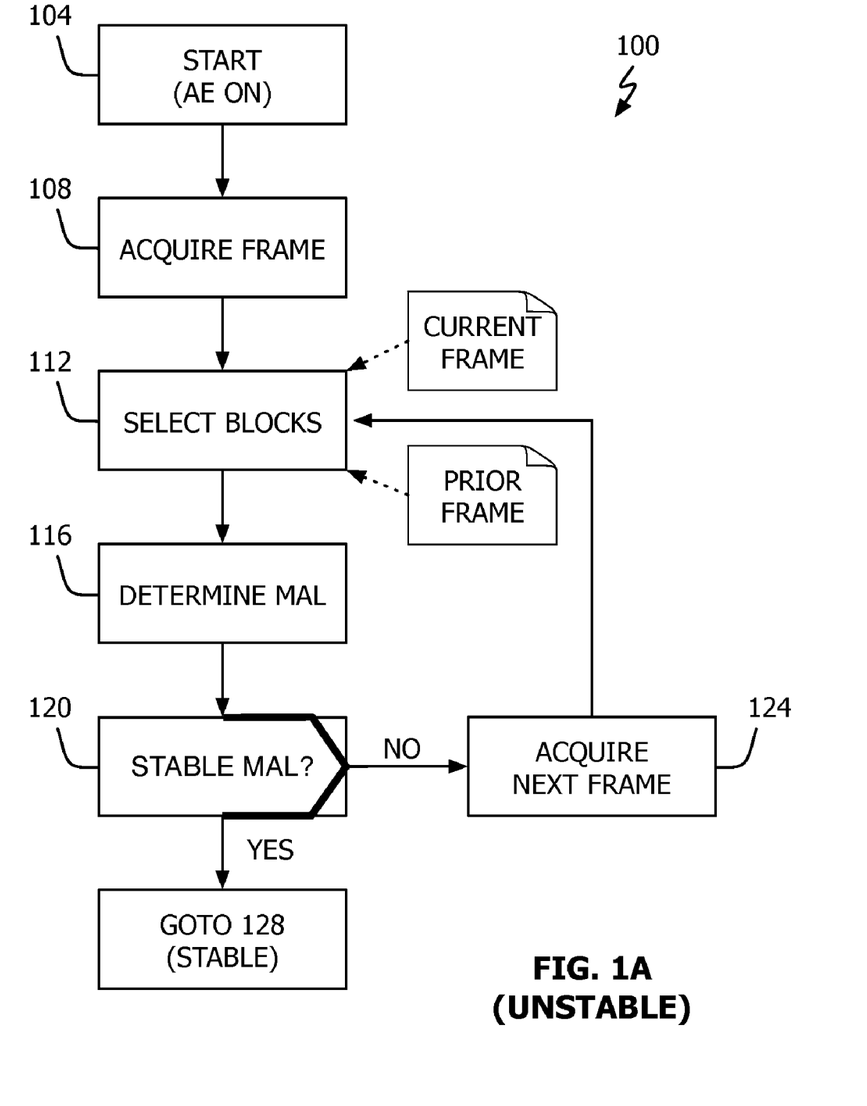
FIGS. 1A-1C show a scene-aware auto-exposure control process in accordance with one embodiment.

Referring to FIG. 1A, scene-aware auto-exposure control process 100 in accordance with one embodiment begins when a camera (video or still) is first activated for scene capture; auto-exposure operation is on and functioning in a normal manner (block 104). Next, a "current" frame is captured (block 108) and compared to a prior frame to determine which blocks within the current frame should be used to calculate a MAL value (block 112).

Figure 2:
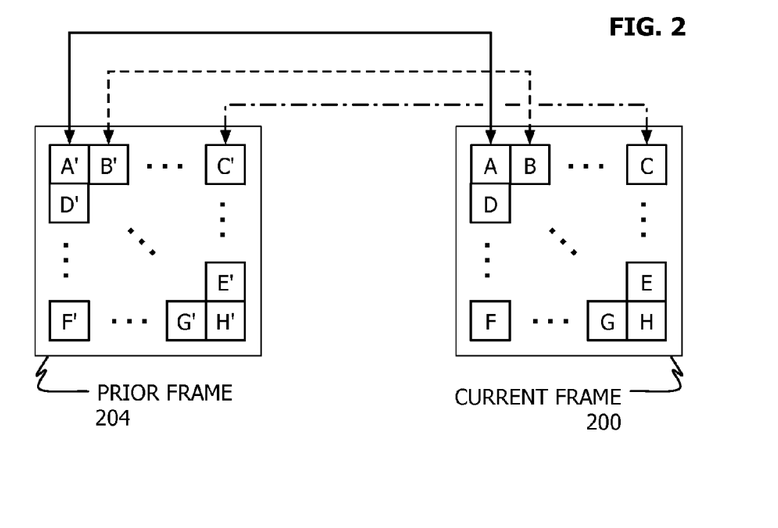
FIG. 2 shows a current frame and prior frames divided into co-located blocks in accordance with one embodiment.

For purposes of this description, a frame consists of an array of pixel values (e.g., 1280×960, 640×480 or 320×240) which may be divided into blocks (e.g., 8×8, 16×16 or 32×32 pixels). As illustrated in FIG. 2, acts in accordance with block 112 compare specified blocks in current frame 200 with co-located blocks in prior frame 204. For example, block A in current frame 200 is compared to block A' in prior frame 204, block B is compared with block B' and so on. In one embodiment, every block in current frame 200 is compared with its co-located block in prior frame 204. In another embodiment, every second (third, . . . ) block in the two frames are compared. In still another embodiment, a specified number of blocks are chosen randomly for comparison or, alternatively, blocks are chosen randomly until a specified number have been identified (block 112).

Figure 3:
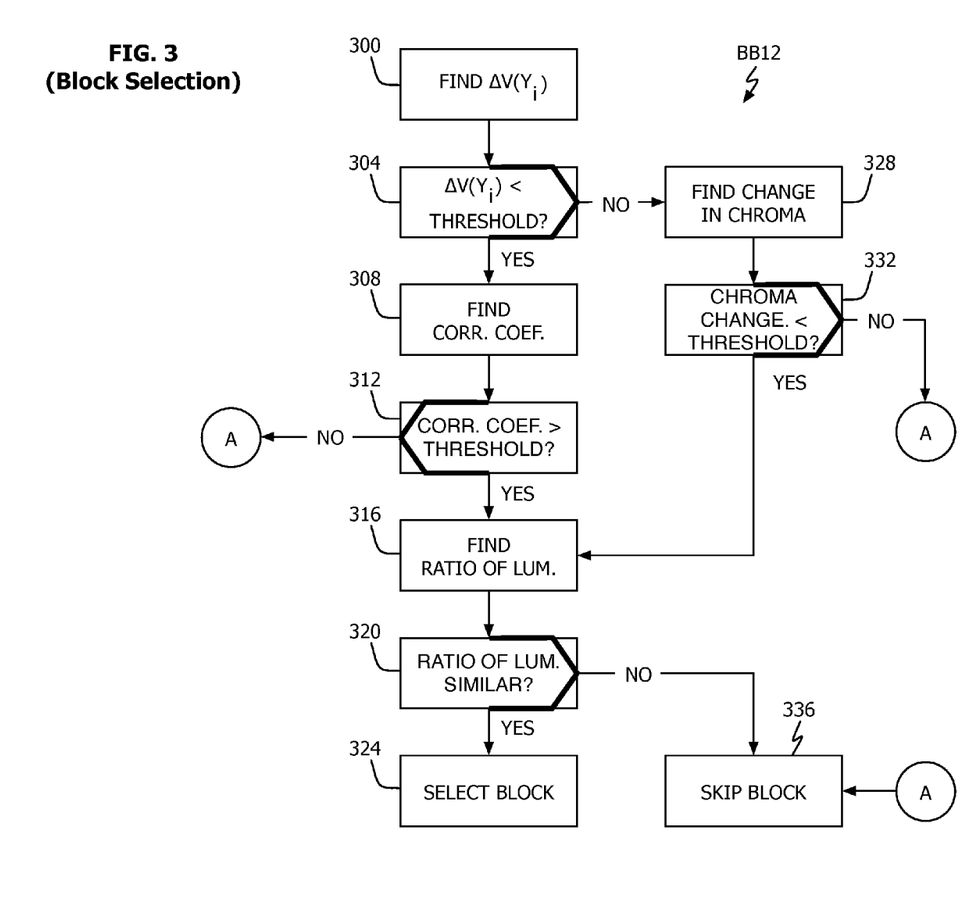
FIG. 3 shows a block selection process in accordance with one embodiment.

The current block may be selected in accordance with block 112 based upon one or more of the: correlation between blocks; variance differences between blocks; variance ratios between blocks; luminance ratios between blocks; chrominance ratios between blocks; or other sampling techniques. By way of example, consider FIG. 3 in which block selection process for block 'i' begins by determining the difference in the variance in the luminance of the pixels between block 'i' in the current frame and block 'i' in a prior frame—$\Delta V(Y_i)$ (block 300):

$$\Delta V(Y_i) = V(Y_i)_{current} - V(Y_i)_{prior} \qquad \text{EQ. 1}$$

where $V(Y_i)_{current}$ represents the variance in the luminance of block 'i' in the current frame (e.g., frame 200) and $V(Y_i)_{prior}$ represents the variance in the luminance of block 'i' a prior frame (e.g., frame 204). In one embodiment, $V(Y_i)_{current}$ and $V(Y_i)_{prior}$ may be the sum of the individual luminance values in block 'i' in the current and prior frames respectively. In another embodiment, $V(Y_i)_{current}$ and $V(Y_i)_{prior}$ may be the average of the individual luminance values in block 'i' in the current and prior frames respectively.

If $\Delta V(Y)$ is less than a specified threshold (the "YES" prong of block 304), the correlation coefficient between the pixels in the current and prior blocks is calculated (block 308), which may then be tested against a correlation coefficient threshold (block 312). As a practical matter, the variance threshold of block 304 is empirically determined and should be above the image capture device's noise level. In general, the correlation coefficient threshold may be between 0.8 and 0.99 (e.g., 0.9 or 0.95). In practice, however, any value that suggests there is similar structure between the two blocks with a high degree of confidence is acceptable. If the calculated correlation coefficient is greater than the specified correlation coefficient threshold (the "YES" prong of block 312), the ratio of luminance values is determined (block 316). In one embodiment, a luminance ratio between block 'i' in the current frame and block in a prior frame may be defined as follows:

$$\text{Block Luminance Ratio} = \frac{(\text{Luminance Block } i)_{current}}{(\text{Luminance Block } i)_{prior}}, \qquad \text{EQ. 2}$$

where $(\text{Luminance Block i})_{current}$ represents the luminance of block 'i' in the current frame and $(\text{Luminance Block i})_{prior}$ represents the luminance of block 'i' in a prior frame. In one embodiment, $(\text{Luminance Block i})_{current}$ and $(\text{Luminance Block i})_{prior}$ may be the sum or average of the individual luminance values in block 'i' in the current and prior frames respectively. In similar fashion, a frame luminance ratio may be defined as follows:

$$\text{Frame Luminance Ratio} = \frac{(\text{Luminance Current Frame})}{(\text{Luminance Prior Frame})}. \qquad \text{EQ. 3}$$

In one embodiment, (Luminance Current Frame) and (Luminance Prior Frame) may be the sum, average or median of the individual luminance values that comprise the current frame and prior frames respectively.

If these two ratios yield similar results (the "YES" prong of block 320), the current block (block 'i') is selected for use in determining a MAL (block 324). As used here, the ratios are similar if they are within approximately 5% to approximately 15% of one another. It will be recognized this value is dependent upon the image capture sensor's noise level and may vary considerably from implementation to implementation. It will further be recognized that, rather than using a luminance ratio one could also use chrominance ratios.

If $\Delta V(Y)$ is greater than the specified variance threshold (the "NO" prong of block 304), a second test based on chrominance may be used. More specifically, the change in chrominance between the current frame and a prior frame may be determined (block 328). By way of example, a block's chrominance may be the sum or average of the block's individual pixel chrominance values. If the chrominance change is less than a specified chrominance threshold (the "YES" prong of block 332), processing continues at block 316. In general, the chrominance threshold is empirically determined. In one embodiment, a chrominance difference threshold of between approximately 5% to 15% (e.g., an absolute difference of between approximately 15 and 40) may be used. If any of the tests of blocks 312, 320 or 332 fail, the current block is not used to determine a MAL (block 336).

In another embodiment, failure of a given test need not result in the accumulation of no weight. More specifically, rather than simply skipping the assignment of additional weight at each test-point (as illustrated in FIG. 3), it is possible to merely adjust the weight. An illustrative embodiment taking this approach is shown in pseudo-code in Table 1. Block selection process in accordance with this embodiment begins by initializing the current block's weight value ($w_i$) to zero (line L1). Next, the difference in the variance in the luminance of the pixels between block 'i' in the current frame and block 'i' in a prior frame, $\Delta V(Y_i)$, may be calculated in accordance with EQ. 1. (line L2). If $\Delta V(Y_i)$ is less than a first specified threshold (line L3), the correlation coefficient between the pixels in the current and prior blocks is calculated (line L4). If the resulting correlation coefficient is not to small (e.g., above approximately 0.8 or 0.85) (line 15), weight $w_i$ may be incremented (line L6). In addition, if the resulting correlation coefficient is very large (e.g., above approximately 0.9 or 0.95) (line L7), weight $w_i$ may be incremented again (line L8).

TABLE 1

Illustrative Block-Selection Pseudo-Code

Block Selection Process( )
{
   Initialize block weight $w_i$(e.g., $w_i$ = 0)　　　　　　　　L1
   Find $\Delta V(Y_i)$　　　　　　　　　　　　　　　　　　　　L2
   If ($\Delta V(Y_i)$ < Threshold-1) then　　　　　　　　　　　　L3
   {
     Find Correlation Coefficient, R　　　　　　　　　　L4
     If (R is not low) then　　　　　　　　　　　　　　　L5
       increment $w_i$　　　　　　　　　　　　　　　　L6
     If (R is very high) then　　　　　　　　　　　　　　L7
       increment $w_i$　　　　　　　　　　　　　　　　L8
   }
   else
   {　　　　　　　　　　　　　　　　　　　　　　　　　　L9
     Find chrominance difference　　　　　　　　　　　L10
     If (chrominance difference < Threshold-2) then　　　L11
       increment $w_i$　　　　　　　　　　　　　　　　L12
   }
   Find ratio of luminance　　　　　　　　　　　　　　　L13
   If (ratio of luminance is similar) then　　　　　　　　　L14
     increment $w_i$　　　　　　　　　　　　　　　　　　L15
}

If $\Delta V(Y)$ is not less than the first specified threshold (line L9), the change in chrominance between the current frame and a prior frame may be determined as discussed above in connection with the acts of block 328 (line L10). If the chrominance difference is less than a second specified threshold (see discussion above) (line L11), weight $w_i$ may be incremented yet again (line L12). Finally, the ratio of luminance values may be determined in accordance with EQS. 2 and 3 (line L13). If the block and frame luminance are similar (see discussion above) (line L14), weight $w_i$ may be incremented a final time (line 115). With respect to lines L4 through L8, one of ordinary skill in the art will recognize that if the correlation between pixels in the current and prior block is high, the blocks weight value $w_i$ is incremented twice— indicating there is very likely a good match between the two blocks.

Referring again to FIG. 1A, once a number of blocks are selected the MAL for the current frame may be calculated (block 116). In one embodiment, the MAL is defined as the average of the weighted luminance values of all of the blocks identified during acts in accordance with block 112:

$$MAL_{current} = \frac{1}{N}\sum_{i=1}^{N} W_i \times Y_i, \qquad \text{EQ. 3}$$

where N represents the number of blocks selected in block 112, $w_i$ represents the weight of block 'i' and $Y_i$ represents the luminance of block 'i' In one embodiment, $Y_i$ represents the sum of the luminance of each pixel in block 'i'. In another embodiment, $Y_i$ represents the average luminance of all pixels in block 'i'. In still another embodiment, $Y_i$ represents the median luminance value of all pixels in block 'i'. One of ordinary skill will recognize that MAL values may be based on unmodified luminance values (i.e., the special case where $w_i$ for each selected block is unity).

Figure 4:
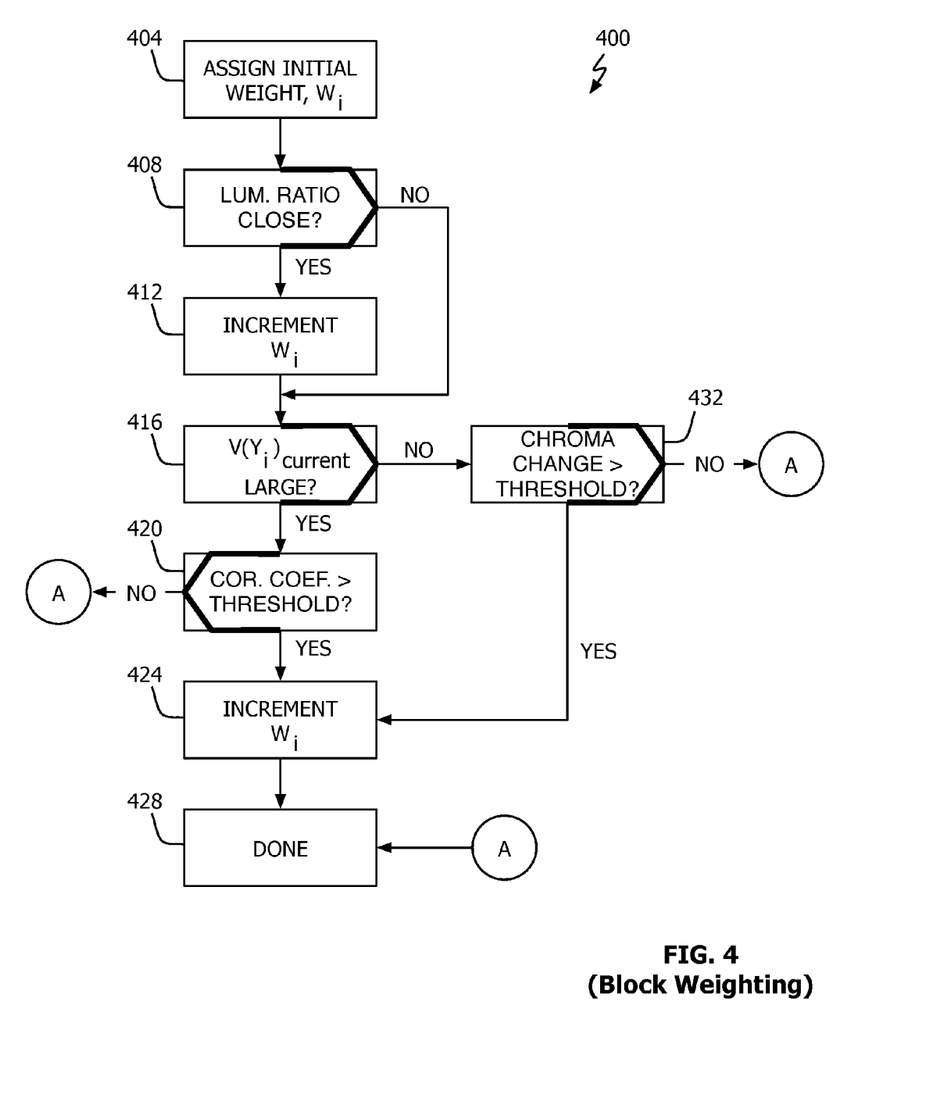
FIG. 4 shows a block weighting factor technique in accordance with one embodiment.

While virtually any weighting factor assignment scheme may be used, one example process is outlined in FIG. 4. As shown there, illustrative weight assignment process 400 begins by making an initial weight assignment (block 404). In the embodiment described herein, this initial assignment is zero (0). Following this, a test is made to determine if the block and frame luminance ratios, as described above with respect to EQS. 2 and 3, are close (block 408). If these two ratios are "close" (the "YES" prong of block 408), weight $w_i$ is incremented (block 412). As before, the luminance ratio's may be considered "close" if they are within approximately 5% to approximately 15% of one another (the precise value being implementation dependent and subject to empirical determination). For purposes of this disclosure, weight factor incremented by one (1). This, however, is not necessary. Weight factor $w_i$ may be incremented by any desired amount commensurate with the specific implementation being considered (e.g., by 2 or one-half). If the luminance ratios are not close (the "NO" prong of block 408), the act of incrementing in accordance with block 412 is skipped.

A second test may then be performed to determine if the variance in the luminance of the current frame's current block is large, $V(Y_i)_{current}$ (block 416). See discussion above with respect to EQ. 1. If this variance is large (the "YES" prong of block 416), a further test to determine if the correlation coefficient between the current frame's current block (block 'i') and the prior frame's corresponding/co-located block is made (block 420). As used herein, a "large" variance is one that is above the image capture device sensor's noise threshold. If the calculated correlation coefficient is large (the "YES" prong of block 420), weight $w_i$ is incremented (block 424) after which weight assignment process 400 is complete (block 428). If the calculated variance is not large (the "NO" prong of block 416), a further test to determine if the change in chrominance between the current frame's current block (bock 'i') and the prior frame's corresponding block is made (block 432). If this chrominance change is large (the "YES" prong of block 432), weight $w_i$ is incremented (block 424) after which weight assignment process 400 is complete (block 428). As used herein, a "large" chrominance change is approximately 5 chrominance levels. It will be recognized, however, that this value is highly implementation dependent. It will be recognized that, in general, chrominance values range between 0 and 255 or between 16-235 depending on the color space. It will further be recognized that the actual appearance of the colors based on these levels are dependent upon the capture device and how it converts from it's captured values and the resulting 0-255 range. If either the calculated correlation coefficient is small (the "NO" prong of block 420) or the change in chrominance is small (the "NO" prong of block 432), weight assignment process 400 is complete (block 428). The resulting weight $w_i$—0, 1 or 2 in this example—may then be used in the calculation of MAL (see EQ. 3).

While somewhat complex in its implementation, the goal of weight assignment process 400 is to derive a weight value that is non-zero only if the scene's illumination changes. That is, mere scene changes (e.g., caused by an object moving into, out-of or through the scene) are substantially ignored.

Referring again to FIG. 1A, with a MAL determined a test is made to determine if it is "stable" (block 120). If the MAL is determined to be stable (the "YES" prong of block 120), processing continues at block 128 in FIG. 1B. If the MAL is not stable (the "NO" prong of block 120), the next frame is captured (block 124)—making it the "current frame"—whereafter processing continues at block 112. In one embodiment, the current frame's MAL is "stable" if it has not changed significantly (e.g., 3%, 5%, 10%) over the last "N" frames (e.g., 8, 12, 16). For example, if N equals 5, the current frame's MAL is "stable" if it does not differ from the 4 preceding MAL's by more than 5%.

Figure 1B:
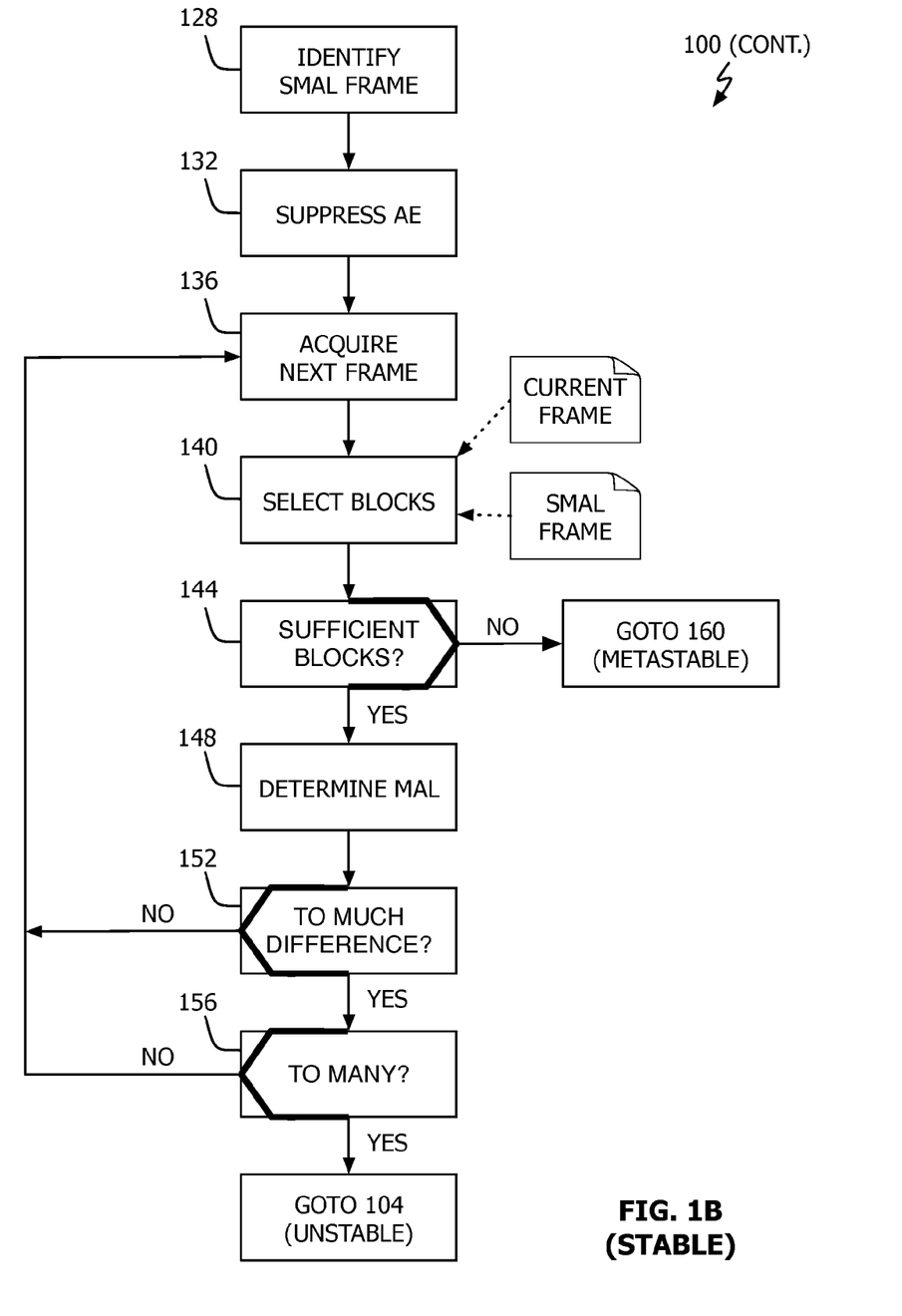

Referring to FIG. 1B, a stable MAL (SMAL) frame is identified (block 128). In one embodiment, that frame for which the most recent stable MAL was calculated (i.e., the "current" frame) is identified as the SMAL frame. Once an SMAL frame is identified, auto-exposure operation may be suppressed (block 132).

Figure 5A:
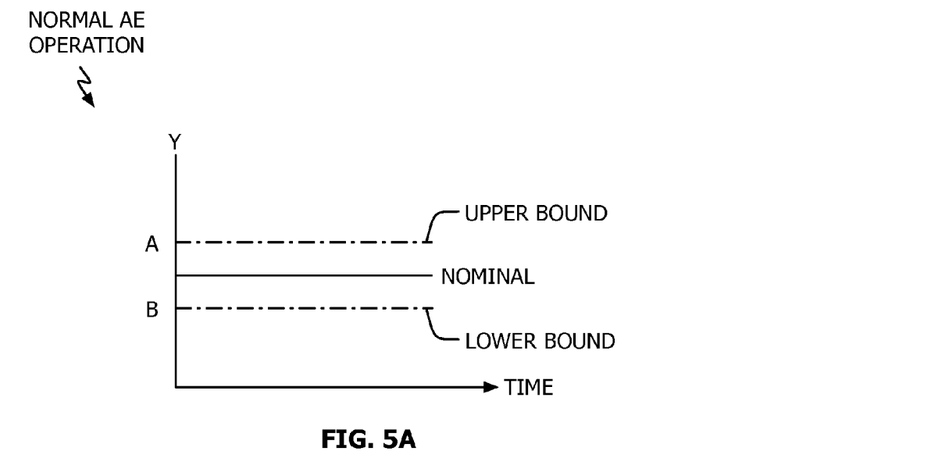
FIGS. 5A and 5B illustrate auto-exposure suppression in accordance with one embodiment.
Figure 5B:
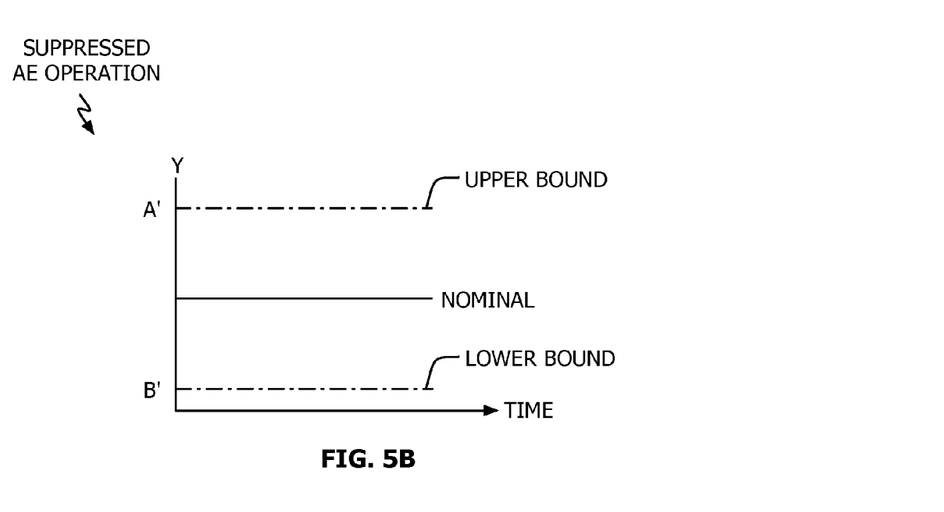

As used herein, the term "suppressed" means to make less sensitive. One example of suppressing auto-exposure operations may be seen by comparing FIGS. 5A and 5B. In FIG. 5A, upper and lower auto-exposure adjustment bounds are set at luminance levels A and B respectively. Thus, during normal operation a scene luminance change must only exceed upper adjustment bound A or lower adjustment bound B before an auto-exposure adjustment takes place. In contrast, with the auto-exposure adjustment bounds set to A' and B' as shown in FIG. 5B, it takes a much larger scene luminance change to trigger an auto-exposure adjustment. The auto-exposure adjustment settings (A' and B') in FIG. 5B are said to be suppressed with respect to those in FIG. 5A. While upper and lower adjustment bounds have been moved symmetrically about the auto-exposure's nominal setting in FIGS. 5A and 5B, this is not necessary. Each bound may be moved independently of the other. In addition, auto-exposure operations may be effectively turned off by moving both the upper and lower bounds to "infinity."

Referring again to FIG. 1B, once auto-exposure operation is suppressed in accordance with block 132, the next frame is acquired (block 136). The newly captured frame becomes the "current" frame whereafter blocks are selected as discussed above with respect to block 112 and FIG. 3 (block 140): now, however, the "prior" frame is the SMAL frame. If a sufficiently large number of blocks are selected (the "YES" prong of block 144), the current block's MAL is determined as discussed above with respect to block 116 (block 148). If there is to big a difference between the current frame's MAL and the SMAL value (the "YES" block of 152) and this has occurred to many times (the "YES" prong of block 156), auto-exposure control is restored at block 104 of FIG. 1A. If there was not a sufficiently large difference between the current frame's MAL and the SMAL value (the "NO" prong of block 152) or a sufficiently large difference had not occurred to many times (the "NO" prong of block 156), operations continue at block 136.

What constitutes a "sufficient" number of blocks for purposes of block 144 is implementation dependent. For example, if every block of the current frame is compared to its co-located block in the SMAL frame during acts in accordance with block 140, at least 10%-20% of the possible blocks must be selected. If only every-other block is used, then 5%-10% of the possible blocks must be selected to be "sufficient."

What constitutes "to large" a difference for purposes of block 152 is highly implementation dependent. In one embodiment, however, a 5% threshold is used. That is, if the current frame's MAL value is within 5% of the SMAL value the difference is deemed to be "not to big."

For purposes of block 156, a counter may be kept that is incremented each time the current frame's MAL is to different (e.g., exceeds the 5% threshold) and decremented every time the current frame's MAL is not to different (limiting the counter's lower bound to zero). The value of the counter that constitutes "to many" for purposes of block 156 is arbitrary but should be high enough to permit the occasional noisy frame and low enough to capture a true scene lighting change. In one embodiment, the "to many" limit may be 5 to 10 frames.

Figure 1C:
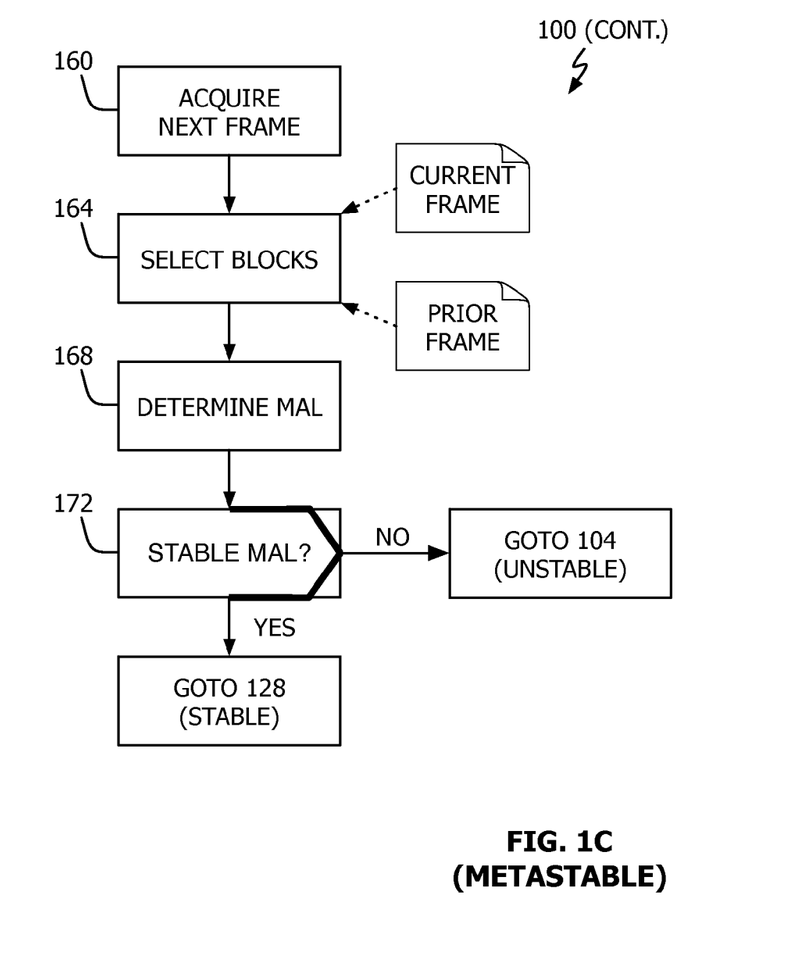

Referring now to FIG. 1C, block 160 is reached only when auto-exposure operation has been suppressed, but an insufficient number of blocks have been selected between the SMAL frame and the current frame to make continued operation based on the SMAL frame secure. Accordingly, on entry of this portion of scene-aware auto-exposure control process 400, a new frame is acquired, making it the "current frame" (block 160). Next, blocks are selected in accordance with block 112 in FIG. 1A where the comparison is now between the current frame and the prior frame—not the SMAL frame (block 164). Following block selection, the current frame's MAL is determined (block 168) and a test is made to determine if it is stable (block 172). If the current frame's MAL is stable (the "YES" prong of block 172), operations continue at block 128 in FIG. 1B. If the current frame's MAL is not stable (the "NO" prong of block 172), operations continue at block 104 in FIG. 1A. As used herein, a stable MAL for purposes of block 172 means the current frame's MAL has not changed significantly (e.g., 3%, 5%) over the last "N" frames (e.g., 4, 8, 12).

Figure 6:
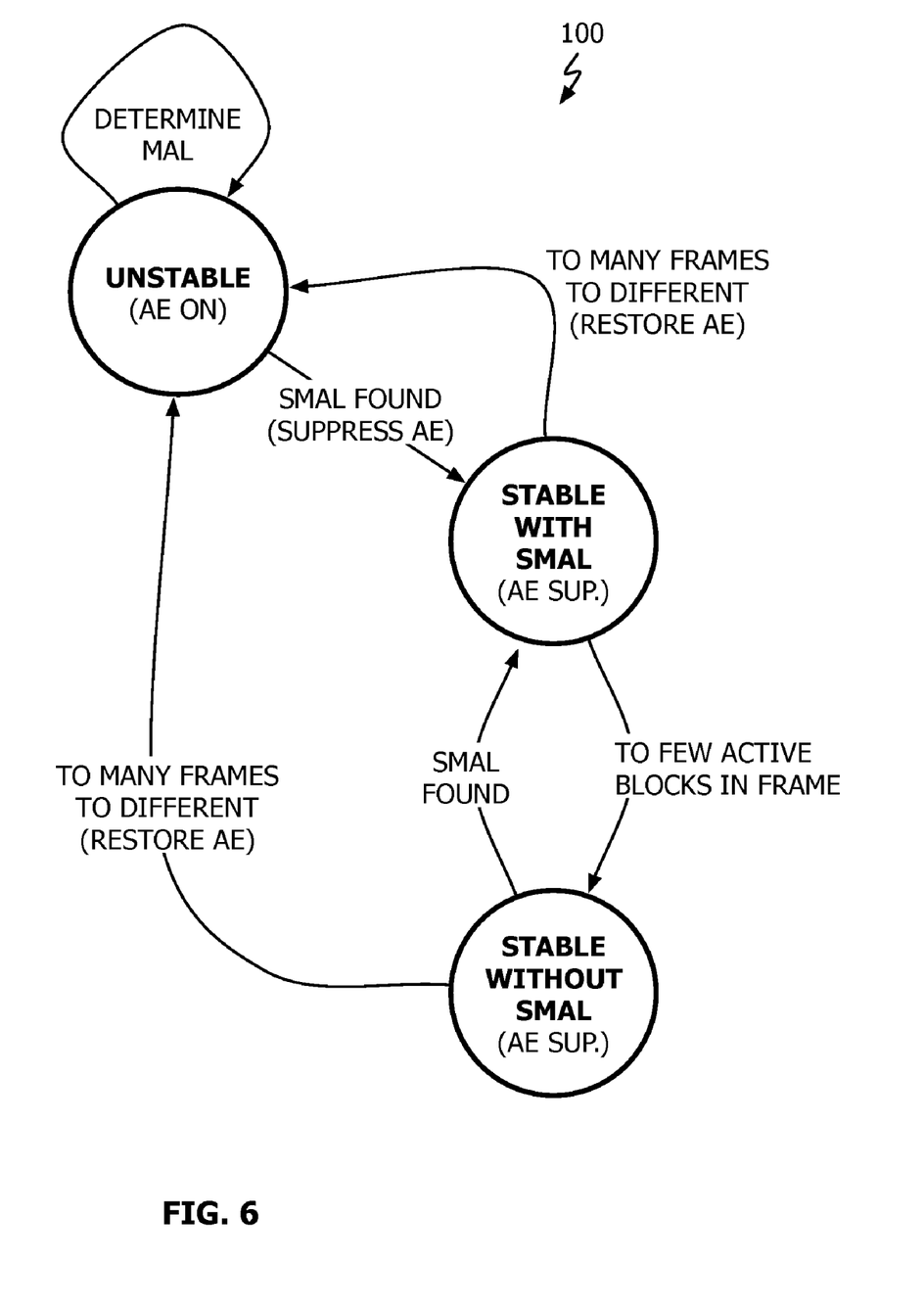
FIG. 6 shows a state diagram for a scene-aware auto-exposure control process in accordance with one embodiment.

As shown in FIG. 6, a review of the foregoing shows scene-aware auto-exposure control process 100 comprises three primary operational phases: unstable (FIG. 1A), stable (FIG. 1B) and metastable (FIG. 1C). During unstable operations no consistent lighting environment has been detected and, accordingly, auto-exposure operations take place as normal. During stable operations a consistent lighting environment has been detected and, therefore, auto-exposure operations may be suppressed. During metastable operations, a lack of information makes continued stable operations suspect. Accordingly, either a stable lighting environment is detected in a relatively short time (in which case stable operations resume) or auto-exposure control is returned to normal (unstable operations resume).

Figure 7:
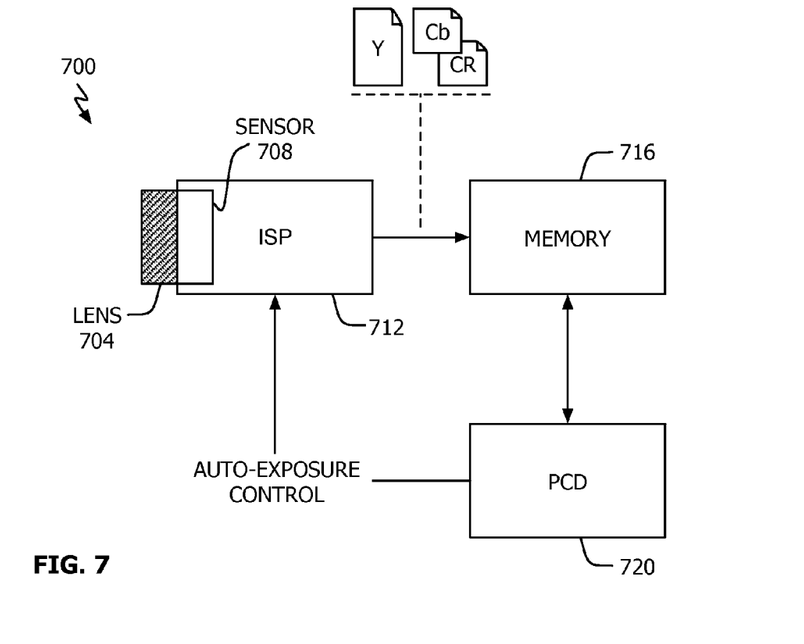
FIG. 7 shows, in block diagram form, an digital image capture device in accordance with one embodiment.

Referring now to FIG. 7, image capture device 700 using a scene-aware automatic-exposure process in accordance with one embodiment includes lens 704, image capture sensor array 708, integrated sensor package (ISP) 712, memory 716 and programmable control device (PCD) 720. Image capture device 700 may be embedded in many electronic devices or other consumer products such as, for example, mobile telephones, hand-held computer systems, desk-top computer systems, personal digital assistants (PDAs), personal entertainment devices and the like. In many current consumer devices, lens 704 may have a fixed aperture and sensor array 708 comprises a fixed array of 3 to 5 mega-pixels.

In general, ISP 712 comprises the hardware necessary to control image capture operations (e.g. exposure control) including exposure control and to perform initial stage image processing (e.g., yielding an image in Y-Cb-Cr format, although other formats are equally possible). For example, ISP 712 includes circuitry for controlling when and for how long sensor 708 collects light for an image. In so doing, exposure control operations are effected. Once ISP 712 outputs an image it is sent to memory 716 where it is stored for future processing. Memory 716 may comprise multiple modules or units each of which may be separately addressable by either ISP 708 or PCD 720. Programmable control device 720 may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate arrays ("FPGAs").

Acts in accordance with FIGS. 1-6 may be performed by PCD 720 executing instructions organized into one or more program modules and tangibly retained in memory 716. Memory suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

Various changes in the materials, components, circuit elements, as well as in the details of the illustrated operational methods are possible without departing from the scope of the following claims. Finally, it is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:
1. An exposure control method, comprising:
obtaining a first image having a plurality of blocks;
obtaining a second image having a plurality of blocks;
comparing a first plurality of blocks in the first image with co-located blocks in the second image;
selecting a second plurality of blocks, from the first plurality of blocks, in the first image based the act of comparing;
calculating a first value of a first metric based on the selected second plurality of blocks; and
suppressing an image capture device's automatic exposure control operation if the calculated first value is stable with respect to a specified number of prior calculated values of the first metric and, after the act of suppressing
obtaining a third image having a plurality of blocks,
comparing a third plurality of blocks in the third image with co-located blocks in the first image,
selecting a fourth plurality of blocks, from the third plurality of blocks, in the third image based the act of comparing,
calculating a second value of the first metric based on the selected fourth plurality of blocks, and
restoring the image capture device's automatic exposure control operation if the calculated second value is significantly different from a specified number of prior calculated values for the first metric, each of the specified number of prior calculated values for the first metric having been calculated after the act of suppressing the image capture device's exposure control operation.

2. The method of claim 1, wherein the act of obtaining first, second and third images comprises obtaining images that each include a luminance portion and a chrominance portion.

3. The method of claim 1, wherein the act of comparing a first plurality of blocks in the first image with co-located blocks in the second image comprises comparing every block in the first image with co-located blocks in the second image.

4. The method of claim 1, wherein the act of comparing a first plurality of blocks in the first image with co-located blocks in the second image comprises comparing less then every block in the first image with co-located blocks in the second image.

5. The method of claim 2 wherein the act of selecting each block in the second plurality of blocks is based, at least in part, on a ratio of luminance values between the first image and the second image.

6. The method of claim 2, wherein the act of calculating a first value of a first metric is based, at least in part, on a weighted sum of a luminance value for each block in the second plurality of blocks.

7. The method of claim 6, wherein the act of calculating a first value of a first metric is further based, at least in part, on using the number of blocks in the second plurality of blocks.

8. The method of claim 1, wherein the act of suppressing comprises turning the image capture device's automatic exposure control operation off.

9. The method of claim 1, wherein the act of suppressing comprises reducing the sensitivity of the image capture device's automatic exposure control operation.

10. The method of claim 1, wherein the act of restoring is based, at least in part, on the second value being at least a specified percentage difference from each of the specified number of prior calculated values of the first metric.

11. The method of claim 10, wherein the specified percentage difference is 5%.

12. A non-transitory program storage device, readable by a programmable control device, comprising instructions stored thereon for causing the programmable control device to perform the method of claim 1.

13. A digital image capture device, comprising:
an image capture sensor;

an exposure control device coupled to the image capture sensor;

memory coupled to the image capture sensor;

a programmable control device operatively coupled to the memory and the exposure control device, wherein the memory further comprises instructions for causing the programmable control device to perform the method of claim 1.

14. An automatic exposure control method for an image capture device, comprising:

acquiring a first image frame from an image capture sensor in an image capture device;

acquiring a second image frame from the image capture sensor in the image capture device;

comparing blocks in the second image frame with corresponding blocks in the first image frame;

selecting at least a minimum set of blocks in the second image frame based on the act of comparing, the selected blocks being a first plurality of blocks;

calculating a luminance metric value based on the first plurality of blocks;

suppressing the image capture device's automatic exposure-control if the calculated luminance metric value is stable; and restoring the image capture device's automatic exposure-control if a specified number of luminance metric values determined following the act of suppressing are at least a specified amount different from the calculated luminance metric value based on the first plurality of blocks.

15. The method of claim 14, wherein the act of acquiring first and second image frames comprise acquiring luminance data.

16. The method of claim 14, wherein the act of comparing blocks in the second image frame with corresponding blocks in the first image frame comprises comparing a randomly selected group of blocks in the first image frame with co-located block sin the second image frame.

17. The method of claim 14, wherein the act of calculating a luminance metric based on the first plurality of blocks comprises calculating an average luminance value.

18. The method of claim 17, wherein the average luminance value is calculated as follows:

$$\frac{1}{N}\sum_{i=1}^{N} Y_i$$

where N equals the number of blocks in the first plurality of blocks and $Y_i$ equals a luminance associated with block 'i' in the first plurality of blocks.

19. The method of claim 18, wherein the luminance of block 'i' ($Y_i$) comprises a sum of luminance values for each pixel in block 'i'.

20. The method of claim 19, wherein each calculated block luminance ($Y_i$) is modified by a weight factor so that the luminance metric for the second image frame is calculated as follows:

$$\frac{1}{N}\sum_{i=1}^{N} Y_i \times W_i$$

where $w_i$ a weight factor based on the similarity between block 'i' in the second image frame and block 'i' in the first image frame.

21. The method of claim 14, wherein the image capture device comprises a digital video camera.

22. A non-transitory program storage device, readable by a programmable control device, comprising instructions stored thereon for causing the programmable control device to perform the method of claim 14.

* * * * *